(12) United States Patent
Pelletier (10) Patent No.: US 9,422,694 B2
(45) Date of Patent: Aug. 23, 2016

(54) MANUALLY OPERATED VALVE FOR A SHOWER INSTALLATION SYSTEM

(76) Inventor: Michel Pelletier, Quebec (CA)

( * ) Notice: Subject to any disclaimer, the term of this patent is extended or adjusted under 35 U.S.C. 154(b) by 150 days.

(21) Appl. No.: 14/236,617

(22) PCT Filed: Jul. 31, 2012

(86) PCT No.: PCT/CA2012/000722
§ 371 (c)(1),
(2), (4) Date: Feb. 20, 2014

(87) PCT Pub. No.: WO2013/016808
PCT Pub. Date: Feb. 7, 2013

(65) Prior Publication Data
US 2014/0197344 A1    Jul. 17, 2014

(30) Foreign Application Priority Data
Aug. 2, 2011  (CA) ..................... 2748553

(51) Int. Cl.
*A47K 3/00*      (2006.01)
*F16K 5/10*      (2006.01)
*E03C 1/02*      (2006.01)
*F16K 21/04*     (2006.01)

(52) U.S. Cl.
CPC ............... *E03C 1/025* (2013.01); *F16K 21/04* (2013.01)

(58) Field of Classification Search
CPC .................... E03C 1/025; F16K 21/04
USPC ............................. 4/615; 251/321
See application file for complete search history.

(56) References Cited

U.S. PATENT DOCUMENTS 2,042,278 A    5/1936  Sloan
2,839,264 A    6/1958  Rene
(Continued)

FOREIGN PATENT DOCUMENTS

CN    2234542 Y    9/1996
GB    2185910 A    8/1987
(Continued)

*Primary Examiner* — Huyen Le
*Assistant Examiner* — Christine Skubinna
(74) *Attorney, Agent, or Firm* — Wells St. John P.S.

(57) ABSTRACT

Embodiments of a manually operated valve for a shower installation system are described herein that include: an inlet and an outlet configured for installation of the valve along piping and a valve debit control mechanism including a valve chamber that defines a passage between the inlet and outlet, and a valve actuator that biases the valve debit control mechanism towards a closed position wherein the passage is obstructed and which is movable towards an opened position wherein the passage is opened when a triggering force is applied onto the valve actuator. The valve limits the consumption of water in a shower by automatically preventing the flow of water therethrough unless a user voluntarily triggers and maintains the opening of the valve.

5 Claims, 5 Drawing Sheets

(56) References Cited

U.S. PATENT DOCUMENTS

| | | |
|---|---|---|
| 2,965,313 A | 12/1960 | Jay |
| 2,997,851 A | 8/1961 | Rene et al. |
| 4,193,553 A | 3/1980 | Kelley et al. |
| 4,311,279 A | 1/1982 | Jette |
| 4,427,177 A | 1/1984 | Constantinescu et al. |
| 4,568,060 A | 2/1986 | Sud |
| 4,630,644 A | 12/1986 | Hafner et al. |
| 4,729,135 A | 3/1988 | Titterington |
| 4,934,000 A | 6/1990 | Freedman |
| 5,297,774 A | 3/1994 | Chuang |
| 5,689,843 A | 11/1997 | Duke et al. |
| 6,474,621 B1 | 11/2002 | Vogel |
| 7,325,754 B2 | 2/2008 | Mukai |
| 7,694,359 B1 | 4/2010 | Hall |
| 2005/0284962 A1 | 12/2005 | Mukai |

FOREIGN PATENT DOCUMENTS

| | | |
|---|---|---|
| KR | 20010069284 A | 7/2001 |
| WO | WO PCT/CA2012/000722 | 7/2012 |

MANUALLY OPERATED VALVE FOR A SHOWER INSTALLATION SYSTEM

FOREIGN PRIORITY CLAIM

This is a 35 U.S.C. §371 application of, and claims priority to, International Application No. PCT/CA2012/000722, which was filed on Jul. 31, 2012, and published as Publication No. WO 2013/016808 A1, which claims priority to Canada Patent Application No. 2,748,553, which was filed on Aug. 2, 2011, the entirety of all the applications are incorporated herein by reference.

BACKGROUND

It has been recognized for a long time that a shower is a major source of water and energy wastes. Indeed, many steps performed by a person under the shower jet could be done as effectively, if not more, with the water close. However, few people closes the water while in the shower, the reasons being that a typical installation renders this operation tedious, which most often results in the water temperature being changed in the process.

Considering the above, it is not surprising to see in the literature many attempts to allow easier repetitive openings and closings of the water in a shower. However, as will now be demonstrated, none of the currently offered solutions are effective in changing the very old habits of letting the water flowing during all the shower time, which may explained the lack of successful products on the market to counter this habit and limit water and energy consumptions.

Some of the proposed solutions to the above-noted problems involve a mat or pedal that is position in the tub or on the shower floor and include a foot or weight triggering mechanism to control the opening or closing of the water. These mechanisms are complicated to install and can be hazardous to use considering the slippery floor.

Most of the manually-operated apparatus shower control mechanisms or valves are mountable to or part of the shower head, which share the drawbacks i) of not being adapted to hand showers, ii) to limit their handling to small persons or to those having limited mobility, and iii) remain prone to being left open all time. Also, most manually operated shower control valves are configured to require voluntary actions of the user both to turn it on or off. As such, the user has to voluntarily turn it off once the valve is opened.

SUMMARY

An object of the present invention is to provide a manually operated shower control valve that remains closed unless a user voluntarily keeps actuating the valve.

In accordance with an illustrative embodiment, there is provided a manually operated valve for a shower installation system, the valve comprising:

an inlet and an outlet configured for installation of the valve along piping of the shower installation system; and a valve debit control mechanism including:
  a valve chamber that defines a passage between the inlet and outlet, and
  a valve actuator that biases the valve debit control mechanism towards a closed position wherein the passage is obstructed; the valve actuator is movable towards an opened position wherein the passage is opened when a triggering force is applied onto the valve actuator.

According to another illustrative embodiment, there is provided a shower installation system comprising:

a shower head;

piping for connecting the shower head to a water distribution system; and a manually operated valve as described above;

an inlet and an outlet configured for installation of the valve along the piping; and a valve debit control mechanism including:
  a valve chamber that defines a passage between the inlet and outlet, and
  a valve actuator that biases the valve debit control mechanism towards a closed position wherein the passage is obstructed; the valve actuator is movable towards an opened position wherein the passage is opened when a triggering force is applied onto the valve actuator.

According to a further illustrative embodiment, there is provided a valve comprising:

a conduit;

a shutter mechanism, mounted to the conduit, that is movable between a closed position that obstructs the conduit and an opened position that allows the passage of fluid in the conduit; the shutter mechanism includes a biasing element that creates a biasing force that forces the shutter mechanism into its closed position; and a valve actuator mounted to the shutter mechanism and to the fluid conduit therebetween that forces the shutter mechanism out of its closed position in response to a manual force greater than the biasing force that is applied between the fluid conduit and the valve actuator.

According to a further illustrative embodiment, there is provided a manually operated valve for a shower installation system including piping between a shower head and a water distribution system, the valve comprising:

a body;

a first bore in the body defining and inlet and being connectable to the piping;

a second bore in the body defining an outlet and being connectable to the piping;

a hole in the body defining first and second openings in the body and yielding a fluid passage between the first and second bores;

a plug secured to the body in the hole at the first opening for closing the first opening;

a compression spring mounted to the plug and extending within the hole towards the second opening;

a piston reciprocally mounted in the hole to the compression spring and being biased by the spring towards a first position wherein the piston obstructs the fluid passage; and a trigger mounted to the piston to allow a person manually applying a triggering force onto the piston which is sufficient to compress the compression spring and to move the piston towards a second position wherein the piston frees the fluid passage.

Other objects, advantages and features will become more apparent upon reading of the following non-restrictive description of illustrative embodiments thereof, given by way of example only with reference to the accompanying drawings.

DETAILED DESCRIPTION

In the following description, similar features in the drawings have been given similar reference numerals, and in order not to weigh down the figures, some elements are not referred to in some figures if they were already identified in a precedent figure.

The use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements.

The term "piston" should be construed broadly in the description and in the claims as any member or ensemble of parts that is capable of reciprocating movement with regards to another component.

The term "piping" should be construed broadly in the description and in the claims as including any fluid conduit, that is closed, opened, or partially opened, of any shape, size or material, and that is used to received fluid thereon or therein.

The term "bore", "hole", "recess", "aperture" and the likes should not be construed in the description and in the claims in any limited way with regards to the operation performed for their creation. They can be the result of molding, machining, drilling, boring, etc.

Figure 1:
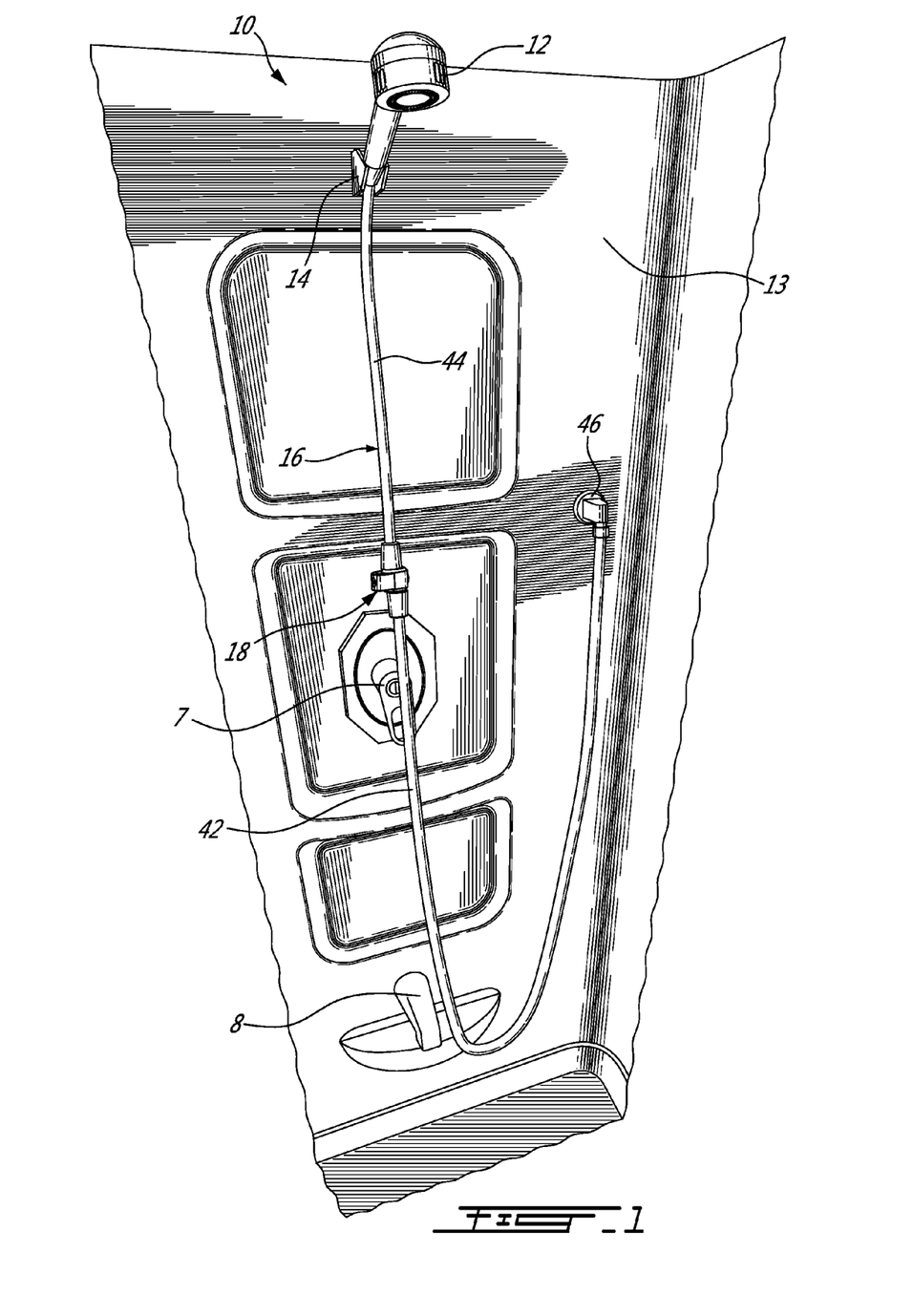
FIG. 1 is a perspective view of a shower installation system including a manually operated valve according to a first illustrative embodiment.

A shower installation system 10 according to an illustrative embodiment is shown in FIG. 1.

The shower installation system 10 comprises a shower head 12 mounted to a wall 13 via a shower head support 14, a shower hose 16 for connecting the shower head 12 to a water distribution system (not shown), and a manually operated valve 18 according to a first illustrative embodiment which is connected to the shower hose 16. The shower installation system 10 also includes a shower faucet, having a handle 7 and a spout 8 and additional piping, such as those hidden within the wall (not shown).

According to the illustrated embodiment of FIG. 1, the shower installation system 10 is of the hand shower type and the shower head 12 is removably received in the support 14. As will become more apparent upon reading the following description, the valve 18 can be connected to any shower installation system, which is not limited to the illustrated embodiment.

Even though, the manually operated valve 18 is shown integrated within the shower installation system 10 using first and second pieces 42, 44 of the hose 16 therebetween, other piping elements (not shown) than the illustrated hose pieces 42 and 44 can be used to install the valve 18.

The person skilled in the art would appreciate that, apart from the presence and mounting of the valve 18 on the hose 16, the shower installation system is conventional and, as such, will not be described herein in more detail.

The manually operated valve 18 will now be described in more detail with reference first to FIGS. 2 and 3.

The valve 18 comprises a main body 22 having a central recess 24 defining a valve chamber, an inlet 26 and an outlet 28 and a valve actuator 20. Each of these elements of the manually operated valve 18 will now be described in more detail.

The inlet 26 is defined by a first cylindrical two-section bore in the body 22, having proximate and distal sections 30-32, and by a first externally threaded neck portion 34, which is a projection of the proximate section 30 of the bore 26 out of the body 22.

Similarly the outlet 28 is defined by a second cylindrical two-section bore in the body 22, having proximate and distal sections 36-38, and by a second externally threaded neck portion 40, which is a projection of the proximate section 36 of the bore 28 out of the body 22.

The first and second threaded neck portions 34 and 40 allow connecting the valve 18 respectively to first and second pieces 42, 44 of the hose 16, each having an end complimentary to the neck portions 34 and 40. The first piece of hose 42 is connected to the water output 46 and the second piece 44 is connected to the shower head 12.

The neck portions 34 and 40 are not limited to the illustrated embodiment and may take any form allowing connecting the valve 18 to pieces of hose or piping having another configuration. For example, the neck portions 34 and 40 can be internally threaded. According to another embodiment (not shown), anyone or both of the neck portions 34 and 40 are omitted and the bore 26 and/or 28 are internally threaded. According to still another embodiment (not shown), another coupling arrangement than threads are provided on the hose pieces 42 and 44 and on the valve 18.

The distal sections 32 and 38 are both smaller and narrower than the proximate sections 30 and 36. According to the illustrated embodiment, proximate and distal sections 26 and 28 are dimension as follows:

proximate section: length=3.16 mm, diameter=6.35 mm;
distal section: length=23.06 mm, diameter=15.88 mm.

According to another embodiment (not shown), the dimensions and proportions of the bore sections 30-32 and 36-38 are different than those illustrated. According to still another embodiment, anyone or both of the bores have a single section, which can be straight or gradually varying (not shown).

The valve chamber 24 defines a passage between the inlet 26 and outlet 28. The valve chamber 24 also receives the valve actuator 20, which defines a valve debit control mechanism 48 with the valve chamber 24.

As will be described hereinbelow in more detail, the valve actuator 20 biases the valve debit control mechanism 48 towards a closed position (see in FIG. 3) wherein the passage defined by the chamber 24 between the inlet 26 and outlet 28 is obstructed. The valve debit control mechanism 48 is movable towards an opened position wherein the passage is opened, when a triggering force is applied between the valve actuator 20 and the body 22. Once the force is released or becomes insufficient to overcome the biasing force produced by the actuator 20, the passage between the inlet 26 and outlet 28 automatically closes.

Since the triggering force is to be applied manually by the user (not shown), and also because a minimal force should be applied onto valve 18 to allow passage of water therein, the valve 18 has been found effective in limiting water consumption during a shower. Also, the valve debit control mechanism 48 causes the opening of passage between the inlet and outlet 26 and 28 to be proportionate to the force applied between the valve actuator 20 and the body 22 and as such further act as a mechanism to control the flow debit of water or more generally fluid therethrough.

The elements of the valve debit control mechanism 48 will now be described in more detail.

The valve chamber 24 is generally cylindrical and includes a shoulder portion 50 which divides the chamber 24 into first and second sections 52 and 54. The distal section 32 of the inlet communicates with the first section 52 of the valve chamber 24, and the distal chamber of the outlet 38 communicates with the second section 54 of the chamber 24.

The debit control mechanism 48 operates by selectively i) blocking the passage between the two sections 52 and 54, thereby blocking the passage between the inlet and outlet 26 and 28, and ii) by allowing graduate opening of the passage between the two sections 52 and 54 upon a user gradually applying a triggering force between the actuator 20 and the body 22.

The actuator 20 includes a piston 56 slidably mounted in the chamber 24 and secured thereto via a plug 58, a biasing element in the form of a compression spring 60 and a trigger button 62. The plug 58 is shaped complementary to the end 61 of the chamber 24 and seals said end.

The piston 56 is a multi-section cylindrical body having a shutter portion 64, which is narrower than both chamber sections 52 and 54, and a trigger portion 66 which snuggly fit within the second section 54 of the chamber 24.

The shutter portion 64 includes a cylindrical aperture 68 that receives the spring 60, a wider portion 70 at the longitudinal end thereof that faces the plug 58, and a first annular recess 72, positioned respectively adjacent the enlarged portion 70 and at the longitudinal end opposite thereof, and receiving a sealing ring 76. A second annular recess 74 is provided that is received in the trigger portion 66 adjacent the shutter portion 64.

The recesses 72 and 74 are defined by enlarged portions 78 and 80 and respectively by the trigger 66 and wider portions 70 of the piston 56.

The enlarged portions 78 and 80 are so dimensioned that the shutter portion 64 snuggly fit in the second section 54 of the chamber 24. The diameter of the wider portion 70 is such that it snuggly fit in the first section 52 of the chamber 24.

The transitions between the narrow section of the shutter portion and the enlarged ends thereof are smooth so as to limit fluid turbulence in the chamber 24 when the valve 18 in its opened configuration.

Of first longitudinal end of the compression spring 60 is attached to the body 22 via the plug 58 to which it is secured. The second end of the spring 60 is mounted within the aperture 68 of the piston 56. The spring 60 is configured and sized so as to position both enlarged portions 78-80 of the shutter portion 64 within the second section 54 of the chamber 24 when the spring is uncompressed. This causes the enlarged portion 80, wider portion 70 and sealing ring therebetween to close the passage between the inlet 26 and outlet 28. This configuration, which is illustrated in FIG. 3, corresponds to the closed position of the valve debit control mechanism 48.

The sealing ring 76 and 80 are provided at both longitudinal ends of the shutter portion 64 to prevent water leakage through the valve 18 during operation thereof.

The trigger portion 66 of the piston 56 includes a wider cylindrical portion 82 extending from the shutter portion 64 and a neck portion 84 extending from the wider portion 82 and that defines a shoulder 86 therewith.

Figure 2:
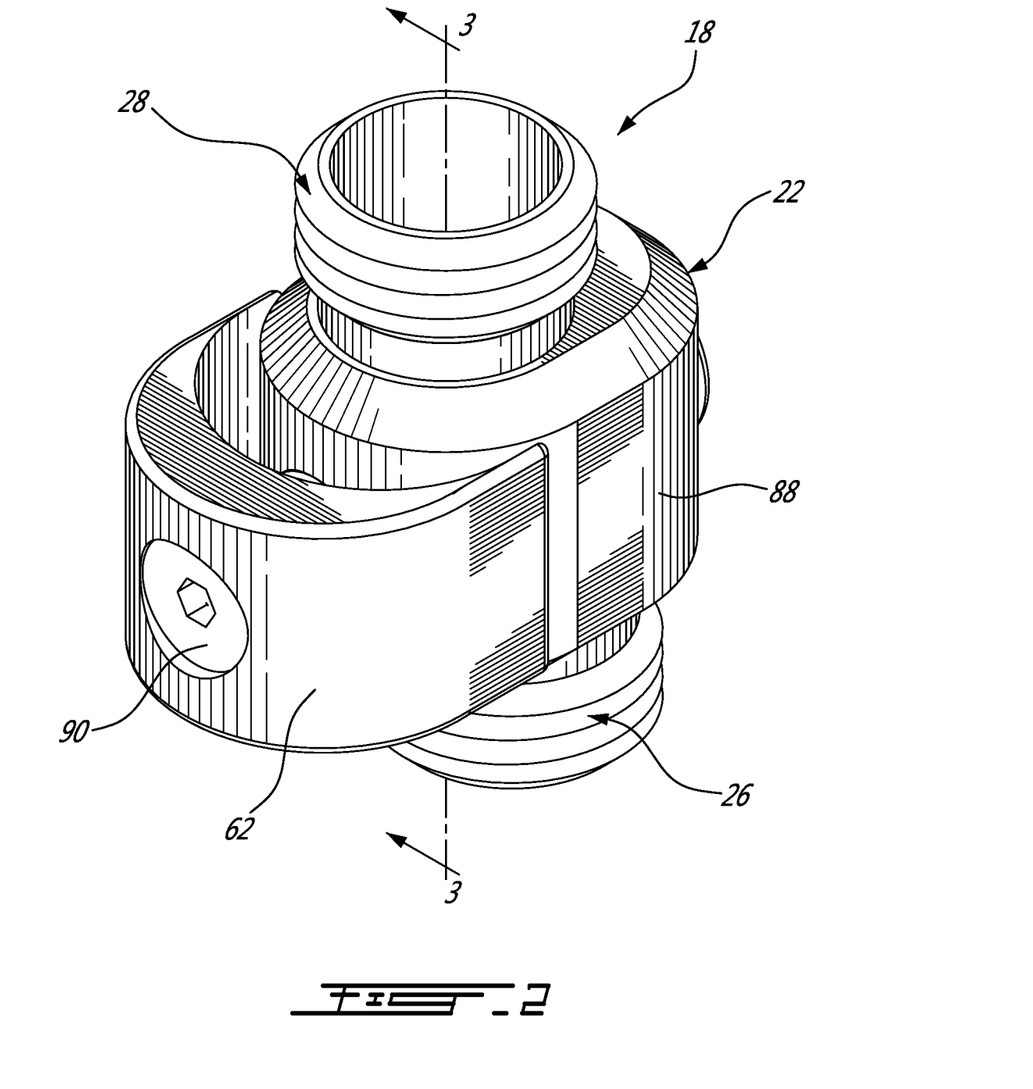
FIG. 2 is a perspective view of the manually operated valve from FIG. 1.

As can be better seen from FIG. 2, the trigger button 62 is in the form of a C-shaped member that is configured and sized to generally complement the oval outer contour 88 of the main body 22.

The trigger button 62 is secured to the triggering portion 66 via a fastener 90. Since the trigger button 62 is attached to the piston 56, pushing onto the trigger button 62 while holding the valve 18 causes the valve debit control mechanism 48 to move from the opened position shown in FIG. 3 to the closed position shown in FIG. 4. More specifically, the configuration and size of the valve 18 allows its operation by holding the valve 18 in the palm of a hand (not shown) and by pressing onto the trigger button 62 using fingers of the same hand in a well-known squeezing movement.

The operation of the manually operated valve 18 will now be described in further detail with reference to FIGS. 3 and 4.

Figure 3:
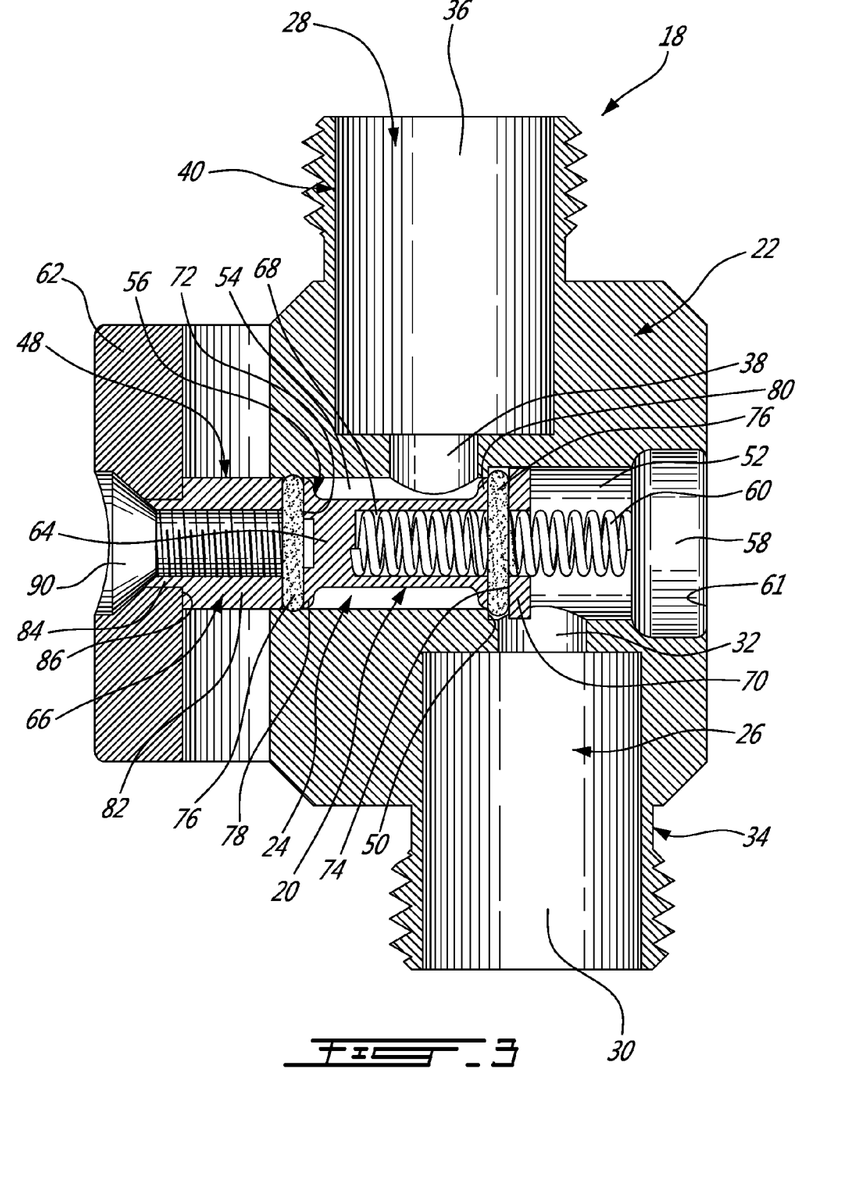
FIG. 3 is a cross-section taken along line 3-3 from FIG. 2, showing the valve in a default closed position.
Figure 4:
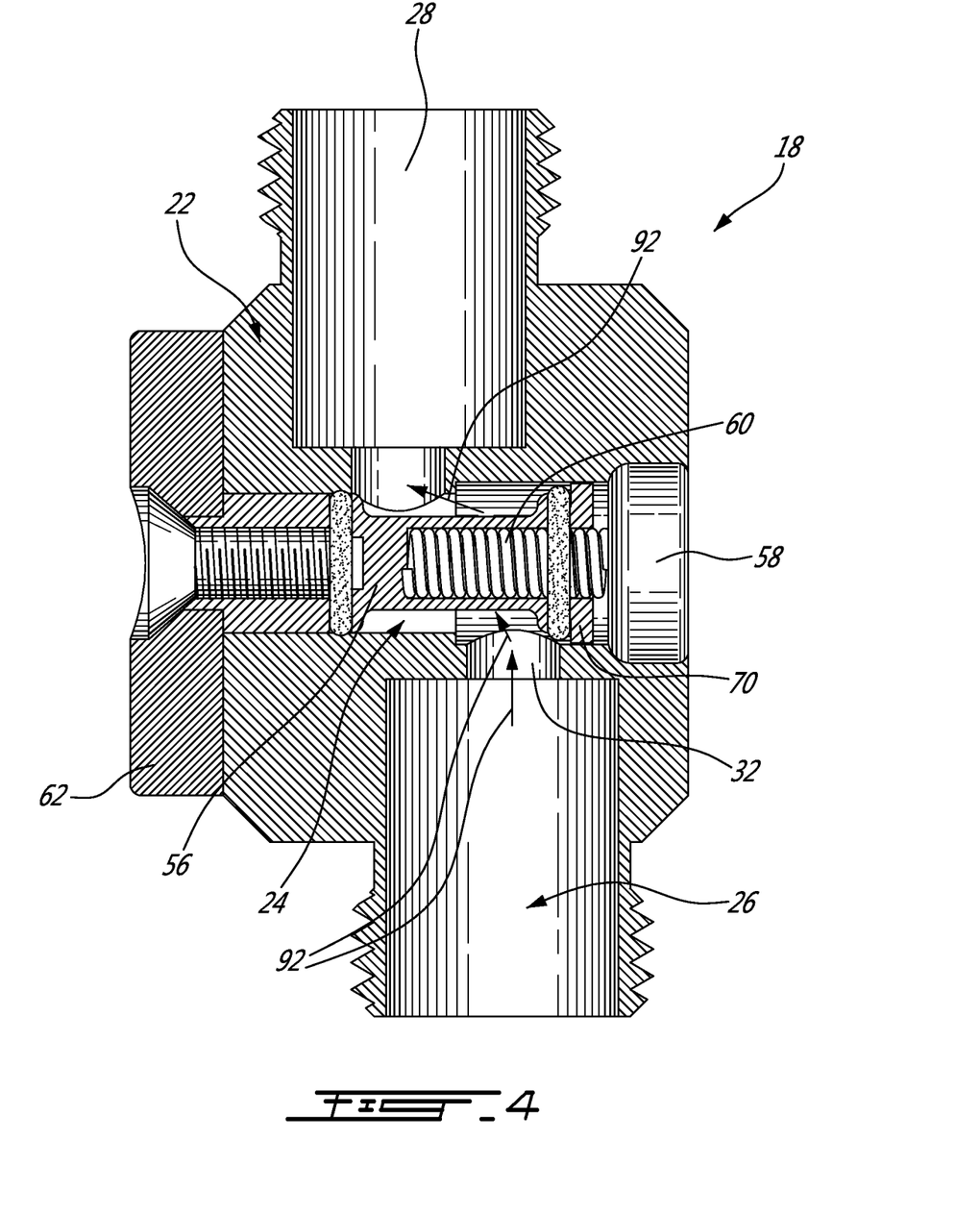
FIG. 4 is a cross-section similar to FIG. 3, showing the valve in a forced open position.

When no force is exerted between the trigger button 62 and the body 22, the valve 18 and more specifically the valve debit control mechanism 48 is in the closed position shown in FIG. 3. In this position, the spring 60 causes the piston 56 to block the passage between the inlet and outlet 26 and 28.

When a triggering force which is greater than the force required to compress the spring 60 is applied by a user between the trigger button 62 and main body 22, the spring 60 gets shorter and the piston 56 is moved towards the plug 58. The longitudinal displacement of the piston 56 is responsive to the force applied onto the trigger button 62. Such a force should be sufficient at least to overcome the biasing effect of the compression spring 60.

As the piston 56 moves towards the plug 58, the longitudinal end of the piston 56, that is defined by the wider portion 70, gradually allows passage to fluid (not shown) from the inlet 26 to the outlet 28 via the distal section 32 of the inlet and the chamber 24 (see arrows 92). The valve 18 is completely opened when the distal section 32 is completely accessible by the chamber 24.

According to the first illustrative embodiment, when the valve debit control mechanism 48 is in the opened position, the trigger button 62 abuts the body 22 and the spring 60 is completely compressed. It is to be noted that an infinite number of intermediary positions are allowed between the closed and opened positions of FIGS. 3 and 4, wherein the passage between the inlet 26 and outlet 28 is partially opened.

The biasing effect of the spring 60 causes the valve debit control mechanism 48 to close automatically whenever the trigger button 62 is released or if the force exerted thereon is insufficient to overcome the biasing force from the spring 60.

It is to be noted that the inlet 26 and outlet 28 are unaligned. This configuration has been found to modify the water or fluid debit through the inlet and outlet.

The expression inlet and outlet have been used with reference to the first illustrative embodiment for reference purposes only and anyone of the bores 26 and 28 can be used as inlet or outlet without consequences to the operation of the valve 18.

Components of the valve 18 are made from a polymeric material such as without limitations polypropylene, polyethylene, or polyamide plastic, with the exception of the fastener 90 and spring 60 which are in metal. According to other embodiments, some or all of the parts of the valve 18 are made of metal or plastic. Other materials, such as ceramic, can also be used to manufacture components of the valve 18.

It is to be noted that the valve debit control mechanism is not limited to the illustrated embodiment.

Also, according to another embodiment, the biasing member is a tension spring that is mounted, for example, to both the body and the trigger portion of the piston or the trigger button therebetween.

The configuration of the piston and/or the location of the sealing rings or the presence of number thereof may also be different than those according to the first illustrative embodiment of the valve 18. It has been found that any one of the configuration, location and number of the sealing can be used to modify the biasing force required by a user to move the valve debit control mechanism 48 between the opened and closed position.

Figure 5:
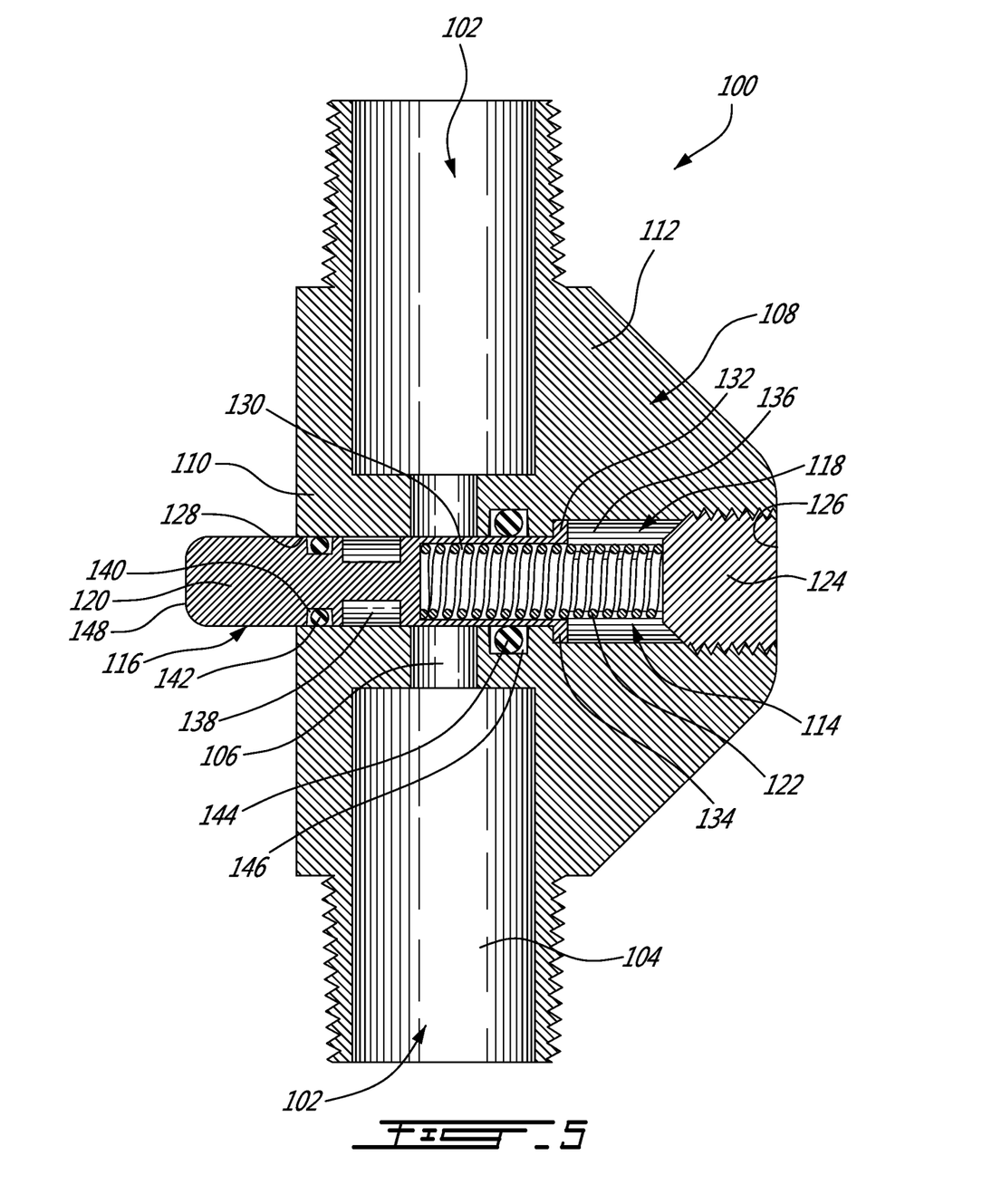
FIG. 5 is a cross-section of a manually operated valve according to a second illustrative embodiment.

The shapes and sizes of the body and trigger button may also differ as will now become more apparent upon reading the following description of a manually-operated valve 100 according to a second illustrative embodiment of the present invention with reference to FIG. 5.

Since the valve 100 is similar to the valve 18, only the differences between these two embodiments will be described herein for concision purposes.

As a first difference between the valve 100 and 18, the inlet and outlet 102 of the valve 100 are identical and substantially aligned.

Similarly to the valve 18, the inlet and outlet 102 of the valve 100 are both defined by a two-section bore, having proximate and distal sections 104 and 106. The dimensions and relative proportions of these two sections 104 and 106 are however different than those according to the first illustrative embodiment.

The main body 108 includes a generally rectangular portion 110, hosting the aligned inlet and outlet 102, and a truncated triangular portion 112 extending from the rectangular portion 110 generally perpendicularly therefrom.

The valve debit control mechanism 114 extends along the width of the body 108 perpendicularly to the axis defined by the inlet and outlet 102.

The valve debit control mechanism 114 comprises an actuator 116 mounted in a recess 118. As will become more apparent upon reading the following description, the recess 118, which defines a valve chamber, is configured and sized to operatively receive the actuator 116 for reciprocating movement therein.

The actuator 116 includes a piston 120 slidably mounted in the recess 118, and a biasing member in the form of a compression spring 122. The spring 122 is secured to the body 108 via a threaded plug 124 which is screwed in a complementary portion of the recess 118 at a first one of two longitudinal ends thereof 126-128. The spring 122 is partially received in a bore 130 provided in the piston 120 coaxially therewith so as to extend therefrom towards the plug 124.

The piston 120 includes a peripheral collar 134 at the longitudinal end 132 thereof. The collar 134 which is provided as a mechanical stop to prevent withdrawal of the piston 120 from the valve chamber 118. The valve chamber 118 includes a first narrow portion (not shown) that receives the main body of the piston 120 in a snuggly fit manner, and an enlarged portion 136 that receives the collar 134 for snuggly reciprocation therein.

The piston 120 further includes a first outer peripheral recess 138 thereabout having a width generally corresponding to the width of the distal section 106 of the inlet and outlet 102.

The recess 138 is located along the piston 120 so as to be generally registered with the inlet and outlet 102 when the spring 122 is compressed. When the inlet and outlet 102 are so aligned with the recess 138, the recess 138 defines a passage between the inlet and outlet 102. The valve 100 is then in its opened position.

The piston 120 also includes a second outer peripheral recess 140 that receives a first sealing ring 142 therein. A second sealing ring 144 is provided in an annular recess 146 in the body 108 so as to closely surround the main body of the piston 126.

The sealing rings 134 and 142 are provided for similar purposes than the rings 76 in FIGS. 2-3.

The length of the piston 120 is such that the longitudinal end 148 thereof opposite the plug 124 extends out of the valve chamber 118 at all time and acts as a trigger 148.

In operation, a user pushes onto the trigger 148 so as to move the piston 120 relative to the body 108 towards the plug 124 so as to partially or completely align the recess 138 with the inlet and outlet 102, causing water or any other fluid to pass from the inlet to the outlet 102.

Releasing the trigger 148 causes the valve 100 to automatically move from its opened to its closed configuration.

According to another embodiment (not shown), the collar is omitted and the withdrawal of the piston 120 is prevented by the spring 122 being secured to the piston 120 in the bore 130.

It is to be noted that many modifications could be made to the manually operated valves and shower installation system described hereinabove and illustrated in the appended drawings. For example:
- the valve can be mounted to rigid piping and is not limited to be mounted to flexible piping, such as the hose 16;
- other coupling arrangements than those described hereinabove and shown in the appended drawings can be provided between the valve and the shower installation system;
- the portions of the piston described hereinabove are not limited to being integral and may be assembled from two or more parts;
- the plug provided to close an aperture in the valve chamber can be omitted. According to another embodiment, the main body of the manually operated valve results from a molding process and the plug is substituted by a molded wall;
- the element or part of the valve actuator that biases the valve debit control mechanism towards a closed position is not limited to a spring. Any other biasing element can also be used. According to some embodiment, the valve actuator is conceived to bias the valve debit control mechanism towards the closed position using the fluid pressure within the valve chamber, wherein it is movable towards an opened position wherein the passage is opened when a triggering force is applied onto the valve actuator which is greater than the fluid pressure.

Although the present invention has been described hereinabove by way of illustrated embodiments thereof, it can be modified, without departing from the spirit and nature of the subject invention as defined in the appended claims.

The invention claimed is:

1. A manually operated valve for a shower installation system including piping between a shower head and a water distribution system, the valve comprising:
   a body;
   a first bore in the body defining and inlet and being connectable to the piping;
   a second bore in the body defining an outlet and being connectable to the piping;

a hole in the body defining first and second openings in the body and yielding a fluid passage between the first and second bores;

a plug secured to the body in the hole at the first opening for closing the first opening;

a compression spring mounted to the plug and extending within the hole towards the second opening;

a piston reciprocally mounted in the hole to the compression spring and being biased by the spring towards a first position wherein the piston obstructs the fluid passage; and a trigger mounted to the piston to allow a person manually applying a triggering force onto the piston which is sufficient to compress the compression spring and to move the piston towards a second position wherein the piston frees the fluid passage.

2. A manually operated valve as recited in claim 1, further including a plug secured to the body in the hole at a first opened end thereof to close the first opened end; the compression spring being mounted in the hole to both the piston and the plug.

3. A manually operated valve as recited in claim 1, wherein the body includes an oval-shaped outer contour portion; the trigger including a C-shaped member that is configured and sized to generally complement the oval-shaped outer contour portion.

4. A manually operated valve as recited in claim 1, wherein at least one of the inlet and outlet includes a first section and a second section between the first section and the hole; the second section being narrower than the first section.

5. A manually operated valve as recited in claim 1, wherein the inlet and outlet are unaligned.

\* \* \* \* \*